United States Patent Office 3,202,640
Patented Aug. 24, 1965

3,202,640
METHOD FOR PRODUCING ACRYLONITRILE-β-[1-VINYL - IMIDAZOLYL - (4)] - ALKYLSULFATES POLYMERS
Masakazu Taniyama, Michihiko Kawakatsu, Natsuo Sawa, Yasuhiro Iwasaki, and Masatoshi Yoshida, all of Kitajima-machi, Itano-gun, Japan, assignors to Toho Rayon Kabushiki Kaisha, Tokyo, Japan, a corporation of Japan
No Drawing. Filed July 14, 1961, Ser. No. 125,035
Claims priority, application Japan, July 22, 1960, 35/32,150
5 Claims. (Cl. 260—79.3)

This invention relates to a method for producing acrylonitrile polymers comprising at least 85 percent by weight acrylonitrile and at least 1 percent but up to 15 percent monomers, such as specific compounds of β-[1-vinyl-imidazolyl-(4)]-ethylsulfate(s) or its metal salts capable of being dyed by conventional procedures, especially under use of basic dyestuffs.

It is well-known that shaped articles, for example, fibers derived from polyacrylonitrile or copolymers of acrylonitrile and other mono-olefinic polymerizable monomers do not have sufficient dye affinity to enable the development of satisfactory colored fibers by commercially available dye-stuffs. Furthermore, it is also known various alkenic derivatives of sulfonic acid will copolymerize or mix with acrylonitrile and that the resulting copolymers are dye-receptive for basic dye-stuffs. For this purpose, it has been proposed to use various compounds of vinyl sulfonic acid or allyl sulfonic acid. When such compounds are employed for preparing acrylonitrile copolymers, certain difficulties are encountered. D. S. Breslow and A. Kutner show that substantially all sorts of derivatives of vinyl sulfonic acid are generally difficult to copolymerize with acrylonitrile (as shown in J. Polym. Sci. 2, 300 (1959)) and not usable in practice, which has also been confirmed by us.

Furthermore, a similar tendency has also been acknowledged in a number of other derivatives of sulfonic acid, for example, allyl sulfonic acid sodium salt and the like.

With increase of proportions of allyl sulfonic acid compounds in the monomer structure, rapid decrease of the molecular weight and reaction velocity will occur. In aqueous solution polymerization for heterogeneous system it has been discovered that the copolymerizing of acrylonitrile with minor proportion of allyl sulfonic acid compound, for instance 1 percent in a monomer mixture brings about 10 to 20 percent lowering of reaction yield from 10 to 20 percent, and especially in molecular weight, a rapid decrease by nearly 40 percent as compared with cases of acrylonitrile alone.

This tendency of substantial lowering of molecular weight is increased by an exponential function with allyl sulfonic acid compounds employed. It has been found that said lowering of molecular weight is chiefly due to the destructive transfer of chain thereof. Moreover, when homogeneous system polymerization, i.e. solution polymerization is performed, these undesirable effects are greatly aggravated and consequently it is preferable to control over polymerization temperatures or amounts of catalyst used.

As a result of these treatments, however, it still follows that polymerization velocity leads to exceedingly small yield and therefore, it cannot be brought into operation at an industrial scale.

It has also been found that a copolymer containing a minor proportion of allyl sulfonic acid derivatives influences on coloration of spinning solution produced by dissolving the copolymer in suitable organic or inorganic solvent and furthermore this objectionable colour may remain in the shaped articles, for example, fibres, filament, yarns, and the like prepared therefrom.

The object of this invention is to provide new and valuable general purpose fibres. A further object of the invention is to provide acrylonitrile polymers which are dye-receptive by conventional dyeing procedures.

In general, those objects of the present invention are accomplished by preparing copolymer comprising at least 85 percent by weight acrylonitrile and at least 1 percent by weight but below 15 percent a compound selected from β-[1-vinyl-imidazolyl-(4)]-ethylsulfate(s) or its metal salts described below.

The preferred comonomers for use are β-[1-vinyl-imidazolyl(4)]-ethylsulfate(s) derivatives having a general formula:

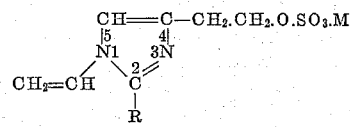

wherein R represents a hydrogen atom or alkyl radical having from 1 to 4 carbon atoms and M represents a hydrogen atom or alkali or alkali earth metals, i.e. Na, K, ½Ca, ½Mg. etc.

These substances are almost water-soluble and white colorless crystals or powders. Apparently, these compounds contain both of two tertiary-basic-nitrogen atoms in imidazol ring and an ionizable sulfate group in 4-position carbon atom which is prepared from, for instance alcoholic side-chain and sulfuric acid in a molecule and therefore, may have tendency toward amphoteric property slightly, but almost predominant acidic characters originated in a sulfate group.

According to the invention, shaped articles, for example, fibres which are obtained from copolymer comprising the amounts of the said comonomer 1 percent to 15 percent, preferably 3 percent to 10 percent by weight respectively, show desirable affinity for basic dye-stuff, whereby the fibres are easily dyed by conventional dyeing procedures to either a strong or a weak level shade and the colored-fibres are fast to light, washing and other fastness tests.

Moreover, it is also found that the physical properties of fibres, for example, a heat resistance, mechanical strengths and whiteness are largely improved, even when the fibre contains relatively a large amount of a specific compound, for example, 10 percent in polymer, selected from the said β-[1-vinyl-imidazolyl-(4)]-ethylsulfate(s) or its metal salts.

Further objects of this invention are based on a discovery that precipitated gels of copolymer comprising a minor proportion of the said comonomer can be easily stretched by subjecting the gels in wet swollen state to tension, in contact with moisture or water at an elevated temperature within a range of about 70° C. to about 110° C. and then, easily bring about the improved fibres of its properties.

The precipitated gels above mentioned have been usually formed by extruding the copolymer solution obtained by dissolving the copolymer in a suitable solvent, for example, high concentrated aqueous solution of zinc chloride, or a mixture comprising mainly zinc chloride and other non-solvent substances for polyacrylonitrile and more water, in a suitable coagulant, usually consist of a mixture of water and solvent used.

In accordance with this invention, even when a minor proportion of comonomer is used, for example, only 5 percent by weight, spinnability, that is easiness with which the gel-tow can be stretched, is by far facilitated and more even when 10 percent by weight is copolymerized with acrylonitrile, the fibre obtained shows exceeding properties and does not involve lowering of thermal resistance or discoloration of fibres as differing from the case, which details are given as under, ordinary observed. Namely, when other compound is adapted for this purpose of improvement of spinnnability, for example such as acrylic acid, methacrylic acid or those esters, it is difficult to maintain the superior characteristics of the fibre which is derived from the polymer containing the amount of comonomer above shown, a heat resistance, mechanical strengths and whiteness, and it is thought owing mainly to the fact that relative large quantity of comonomer must be used to accomplish for its purpose.

By this invention, copolymerization may be usually achieved at high yields, successfully amount to 90 percent or more of percent, and molecular weight also be readily controlled as is desired and further, undesirable discoloring of copolymer has never been observed as differ from the results of the copolymerization of acrylonitrile with a minor amount of allyl sulfonic acid derivatives aforementioned.

In accordance with this invention, if desired, other comonomer component may be employed together and in this case, three copolymerizable monomeric components are mixed at the beginning of the reaction or on the way of it.

In general, the suitable third monomeric components are those which are capable of copolymerization with acrylonitrile, having a unsaturated olefinic function in a molecule and preferably, for instance, such as acrylic acid, methacrylic acid and esters of these compounds.

The amount of the third monomeric component employed may be limited up to 10 percent by weight of the monomer mixture by weight, and naturally, it is desirable that total amount of monomeric comonomers, except acrylonitrile, in the monomer mixture does not exceed 15 percent by weight.

The copolymers which are modified in accordance with this invention may be prepared from various methods, for example, aqueous suspension-polymerization, emulsion polymerization, but a more preferred method is solution-polymerization wherein the polymerization system is kept homogeneous and remained the same throughout the reaction for the beginnning to the end; and moreover it is possible to attach the spinning solution system what polymer solution is finally obtained to the next spinning process, continuously.

For solvents, dimethyl formamide, dimethyl acetoamide, dimethyl sulfoxide and concentrated aqueous solution of zinc chloride or other solvents derived thereof may be available.

The reaction may be catalysed by organic peroxide, azo-compound and furthermore inorganic persulfate, redox catalyst obtained from combination of peroxide or persulfate said above, with reductive agents, for instance, sodium bisulfite, sodium pyrobisulfite and of its other metal derivatives, already well-known. By "copolymer" we mean here is intended to include graft and block polymer as well as copolymer, usually employed as a narrow sense and further, blends thereof. The "copolymer," therefore we mean the polymer containing 1 percent to 15 percent of $\beta$-[1-vinyl-imidazolyl-(4)]-ethylsulfate(s) or its various metal salts in polymer finally obtained and these specific copolymers may be prepared from each proper methods hitherto already known.

Further this invention is set forth in detail with respect to the following examples.

*Example 1*

A mixture of 95 parts (by weight) acrylonitrile and 5 parts $\beta$-[1-vinyl-imidazolyl-(4)]-ethylsulfate was added in 1000 parts water in a closed vessel at 40° C.

After adjustment of pH of this solution to 3.0 with dilute sulfuric acid, 2 parts ammonium persulfate and 1 part sodium bi-sulfite were added, and the solution was maintained at 50° C. throughout the polymerization period of 2 hours. During the reaction, the bottle was tumbled continuously to maintain an intimate mixture of reaction materials under nitrogen atmosphere. The copolymer so obtained was washed in water and dried.

A conversion of 91.5 percent (by weight) of monomer into polymer occurred and 90,000 of molecular weight was (calculated by Staudinger's formula) resulted, which copolymer was found to give a almost colorless, viscous, polymer solution by dissolving to the extent of 15 percent in dimethyl formamide.

This solution was spun through a spinneret into a mixture of 40 percent dimethyl formamide and 60 percent water, then, after washing in water, the gel-tow was stretched to 800 percent in water at 98° C. Thus obtained fibre was almost transparent having 3.9 gr./d. strength, 2.6 gr./d. knot strength and 26% elongation at dried state.

By conventional procedures ordinarily employed, the fibre was successfully dyed with Sevron Blue 5 G, and substantially whole dyestuff was absorbed in 3 percent by weight versus fibre, brilliant strong level shade was obtained.

The dyed-fibre was fast to light, washing and other various tests and was found after heat treatment of period of 30 minutes at 150° C. in air atmosphere, excellent whiteness of fibre, nondyeing, still maintained, and coloring was by no means observed.

*Example 2*

A mixture of 90 parts acrylonitrile, 7 parts $\beta$-[1-vinyl-2-methyl-imidazolyl-(4)]-ethylsulfate-sodium-salt, 3 parts acrylic acid methyl ester and 1000 parts water was heated together in a closed vessel at 60° C. After adjustment of pH of the solution to 3.0 with dilute hydrochloric acid 1.4 parts potassium persulfate and 0.7 part potassium pyrobisulfite were added and polymerized for 2 hrs. with stirring in nitrogen gas. After the polymerization for 2 hours, white colorless coplymer was resulted by converting 90 percent monomer into polymer, and 82,000 molecular weight was obtained.

The copolymer was dissolved to an extent of 10 percent in solvent of a mixture of 40 parts of zinc chloride, 17 parts sodium chloride and 43 parts water, and the thus obtained polymer solution was then extruded through spinnerets into a coagulant of 30 percent by weight of solute of the same composition with the solvent mixture used.

After stretching the gel-tow now obtained 1000% in water at 98° C., and it is relaxed in heated circumstance.

The fibre was transparent and had good thermal stability and physical properties.

With Sevron Red 4 G, the fibre was easily dyed to a strong or a weak level shade as was expected and various fastness tests of dyed-fibre were prominent.

*Example 3*

A mixture of 140 parts acrylonitrile, 9 parts $\beta$-[1-vinyl-2-ethyl-imidazolyl-(4)]-ethylsulfate-potassium salt was dissolved in dimethyl sulfoxide, 3 parts of azo-bis-iso-butylonitrile were added to the solution, then, heated to 50° C.

Under stirring in nitrogen atmosphere for 5 hours, polymerization was performed. Calculating from the weight of shaped articles derived from the solution by coagulating in a water, a conversion of 89 percent of monomer into polymer and 67,000 of molecular weight were resulted. The fibre derived from this polymer solution was found to have a good affinity to Sevron Blue 5 G and show a color of brilliant tone.

*Example 4*

After mixing of a mixture of 9 parts acrylonitrile, 0.3 part $\beta$ - [1 - vinyl-2-methyl-imidazolyl-(4)]-ethylsulfate-magnesium-salt, and 0.7 part acrylic acid methyl ester and a mixed solution of 40 parts zinc chloride, 18 parts calcium chloride and 42 parts water at 60° C., by adding 0.1 part of ammonium persulfate to the solution, polymerization was performed for 2 hours. Reaction was performed to convert 96 percent monomer into polymer, and 75,000 of molecular weight was resulted. The fibre obtained by extruding the poylmer solution into a coagulant bath comprising 35 percent concentration of solute of the same composition with the solvent mixture and the gel-tow was stretched 1100% in a water at 97° C. and further subjected to relaxation in a heated condition, having 3.7 gr./d. strength, 2.8 gr./d. knot strength and 25 percent elongation at dried state.

This fibre was easily dyed with Sevron Red 4 G by conventional procedure, usually applied, and was prominent.

*Example 5*

After mixing a mixture comprising 9.4 parts acrylonitrile, 0.6 part β-[1-vinyl-2-methyl-imidazolyl-(4)]-ethyl-sulfate-barium-salt, and solvent of a mixture including 52 parts zinc chloride, 3 parts acetic acid and 45 parts water at 60° C., with addition of 0.1 part ammonium persulfate to the solution, polymerization was effected for 2 hours. 97 percent yield and 71,000 molecular weight were obtained by estimation.

The gel-tow obtained by the method described in Example 4, was stretched 1050 percent in water at 98° C., and after all, the fibre obtained was shown to have prominent physical properties, for instance, a heat resistance and affinity for basic dyestuff. The invention is defined by the following claims.

What I claim is:

1. A method of preparing polymeric materials which comprises copolymerizing in the presence of a free radical catalyst a compound of acrylonitrile and a monomer, said acrylonitrile being at least 85% by weight of the compound and said monomer being the remaining percentage by weight of the compound, said monomer having the structure:

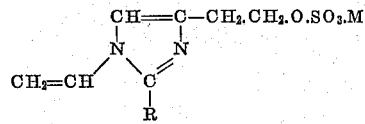

wherein R represents a member of the group consisting of hydrogen and an alkyl radical having 1 to 4 carbon atoms and M represents a member of the group consisting of hydrogen, an alkali metal and an alkaline earth metal.

2. The method defined in claim 1 wherein the monomer is present to the extent of 5% by weight of the total weight of the copolymer.

3. The method defined in claim 1 wherein the monomer is present to the extent of 10% by weight of the total weight of the copolymer.

4. A method of preparing a polymeric material having dye affinity which comprises copolymerizing in the presence of a catalyst a compound of acrylonitrile and a monomer, said acrylonitrile being at least 85% by weight of the compound and said monomer being the remaining percentage by weight of the compound, said monomer having the structure:

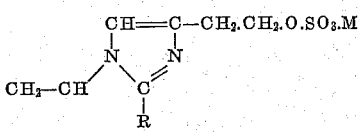

wherein R represents a member of the group consisting of hydrogen and an alkyl radical having 1 to 4 carbon atoms and M represents a member of the group consisting of hydrogen, an alkali metal and an alkali earth metal, and said catalyst is a member selected from the group consisting of an organic peroxide, an azo compound, an inorganic persulfate and a redox catalyst obtained a combination of an inorganic reducing agent and a member from the group consisting of an organic peroxide and an inorganic persulfate.

5. The method as recited in claim 1 wherein a third monomer is copolymerized with said acrylonitrile and said monomer, said third monomer having an unsaturated olefinic function therein and being not more than 10% by weight of the monomer mixture, and said third monomer is a member selected from the group consisting of acrylic acid, an ester of acrylic acid, methacrylic acid and an ester of methacrylic acid.

References Cited by the Examiner

UNITED STATES PATENTS

| | | | |
|---|---|---|---|
| 2,643,990 | 6/53 | Ham | 260—85.5 |
| 2,710,870 | 6/55 | Lawson | 260—79.3 |
| 2,941,986 | 6/60 | Lawson | 260—79.3 |

JOSEPH L. SCHOFER, *Primary Examiner.*

J. R. LIBERMAN, *Examiner.*